US011906695B2

(12) United States Patent
Alghazal et al.

(10) Patent No.: US 11,906,695 B2
(45) Date of Patent: Feb. 20, 2024

(54) METHOD AND SYSTEM FOR GENERATING SPONGE CORE DATA FROM DIELECTRIC LOGS USING MACHINE LEARNING

(71) Applicant: SAUDI ARABIAN OIL COMPANY, Dhahran (SA)

(72) Inventors: Mohammed A. Alghazal, Dhahran (SA); Ghazi Kraishan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 753 days.

(21) Appl. No.: 16/816,770

(22) Filed: Mar. 12, 2020

(65) Prior Publication Data
US 2021/0285326 A1 Sep. 16, 2021

(51) Int. Cl.
| | | |
|---|---|---|
| *G01V 99/00* | (2009.01) | |
| *G01V 1/46* | (2006.01) | |
| *G01V 1/48* | (2006.01) | |
| *E21B 49/08* | (2006.01) | |
| *G06N 3/08* | (2023.01) | |
| *G06N 3/084* | (2023.01) | |

(52) U.S. Cl.
CPC .......... *G01V 99/00* (2013.01); *E21B 49/0875* (2020.05); *G01V 1/46* (2013.01); *G01V 1/48* (2013.01); *G06N 3/084* (2013.01)

(58) Field of Classification Search
CPC ...... E21B 49/0875; G06V 10/25; G01V 1/46; G01V 1/48; G06N 3/08
See application file for complete search history.

(56) References Cited

U.S. PATENT DOCUMENTS

| | | | |
|---|---|---|---|
| 4,009,434 A | 2/1977 | McKinlay et al. | |
| 4,700,140 A | 10/1987 | Fertl | |
| 4,787,983 A * | 11/1988 | DiFoggio | G01N 33/2823 |
| | | | 210/656 |
| 4,866,983 A | 9/1989 | Vinegar et al. | |
| 5,059,907 A * | 10/1991 | Sherman | G01V 3/38 |
| | | | 73/152.08 |

(Continued)

FOREIGN PATENT DOCUMENTS

| | | |
|---|---|---|
| AU | 668903 B2 | 5/1996 |
| CN | 103485770 A | 1/2014 |
| CN | 109948841 A | 6/2019 |

OTHER PUBLICATIONS

Alghazal, Mohammed et al., "Technology Integration to Assess End-point Oil Saturation of the Relative Permeability Curves", IPTC-19614-MS, International Petroleum Technology Conference, Jan. 2020, pp. 1-9 (9 pages).

(Continued)

*Primary Examiner* — Mohamed Charioui
*Assistant Examiner* — Lynda Dinh
(74) *Attorney, Agent, or Firm* — Osha Bergman Watanabe & Burton LLP

(57) ABSTRACT

A method may include obtaining dielectric log data regarding a geological region of interest. The method may further include generating sponge core data of the geological region of interest using a neural network model and the dielectric log data. The neural network model may be trained using various dielectric logs from various well sources. The method may further include determining, using the sponge core data, an amount of hydrocarbons in the geological region of interest.

8 Claims, 5 Drawing Sheets

(56) References Cited

U.S. PATENT DOCUMENTS

| | | | | |
|---|---|---|---|---|
| 5,251,286 | A * | 10/1993 | Wiener | G01V 11/00 |
| | | | | 73/152.16 |
| 5,828,981 | A * | 10/1998 | Callender | G01V 11/00 |
| | | | | 702/6 |
| 6,003,620 | A | 12/1999 | Sharma et al. | |
| 6,719,070 | B1 * | 4/2004 | Puymbroeck | E21B 49/02 |
| | | | | 175/403 |
| 8,510,242 | B2 * | 8/2013 | Al-Fattah | E21B 49/00 |
| | | | | 706/929 |
| 8,820,436 | B2 * | 9/2014 | Reid, Jr. | E21B 49/06 |
| | | | | 175/20 |
| 8,898,045 | B2 | 11/2014 | Chen et al. | |
| 2007/0023626 | A1 | 2/2007 | Riley et al. | |
| 2011/0251795 | A1 * | 10/2011 | DiFoggio | E21B 49/10 |
| | | | | 702/11 |
| 2016/0245065 | A1 * | 8/2016 | Gray | G01V 1/306 |
| 2017/0286802 | A1 | 10/2017 | Mezghani et al. | |
| 2019/0087939 | A1 | 3/2019 | Hakimuddin | |
| 2020/0132875 | A1 * | 4/2020 | Zhang | E21B 47/003 |

OTHER PUBLICATIONS

Norbisrath, Jan Henrik, "Dielectric Permeability Logging", SPWLA 59th Annual Logging Symposium, Society of Petrophysicists and Well Log Analysts, Jun. 2018, pp. 1-10 (10 pages).
International Search Report issued in corresponding International Application No. PCT/US2020/029107, dated Nov. 30, 2020 (6 pages).
Written Opinion issued in corresponding International Application No. PCT/US2020/029107, dated Nov. 30, 2020 (8 pages).

* cited by examiner

METHOD AND SYSTEM FOR GENERATING SPONGE CORE DATA FROM DIELECTRIC LOGS USING MACHINE LEARNING

BACKGROUND

Sponge coring techniques and sponge core analysis have been developed to determine the present oil saturation of a rock formation from sponge core samples. In particular, a sponge from a sponge coring tool may absorb oil that bleeds from the core sample. This oil may be reconstituted back into the core porosity to account for the loss of oil saturation due to bleeding. However, while sponge coring techniques provide a useful measure of oil saturation within a reservoir, sponge core analysis may require a laboratory remote from a well site.

SUMMARY

In general, in one aspect, embodiments relate to a method that includes obtaining dielectric log data regarding a geological region of interest. The method further includes generating sponge core data of the geological region of interest using a neural network model and the dielectric log data. The neural network model is trained using various dielectric logs from various well sources. The method further includes determining, using the sponge core data, an amount of hydrocarbons in the geological region of interest.

In general, in one aspect, embodiments relate to a system that includes a logging system coupled to various logging tools. The system further includes a reservoir simulator including a computer processor, where the reservoir simulator is coupled to the logging system. The reservoir simulator obtains dielectric log data regarding a geological region of interest using the logging system. The reservoir simulator further generates sponge core data of the geological region of interest using a neural network model and the dielectric log data. The neural network model is trained using various dielectric logs from various well sources. The reservoir simulator further determines, using the sponge core data, an amount of hydrocarbons in the geological region of interest.

In general, in one aspect, embodiments relate to a method that includes obtaining acquired sponge core data regarding a reservoir. The method further includes obtaining dielectric log data regarding the reservoir. The method further includes generating a neural network model using various machine-learning epochs and training data including the acquired sponge core data and the dielectric log data. The neural network model is updated during the machine-learning epochs based on a comparison between the acquired sponge core data and predicted sponge core data that is generated by the neural network model.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
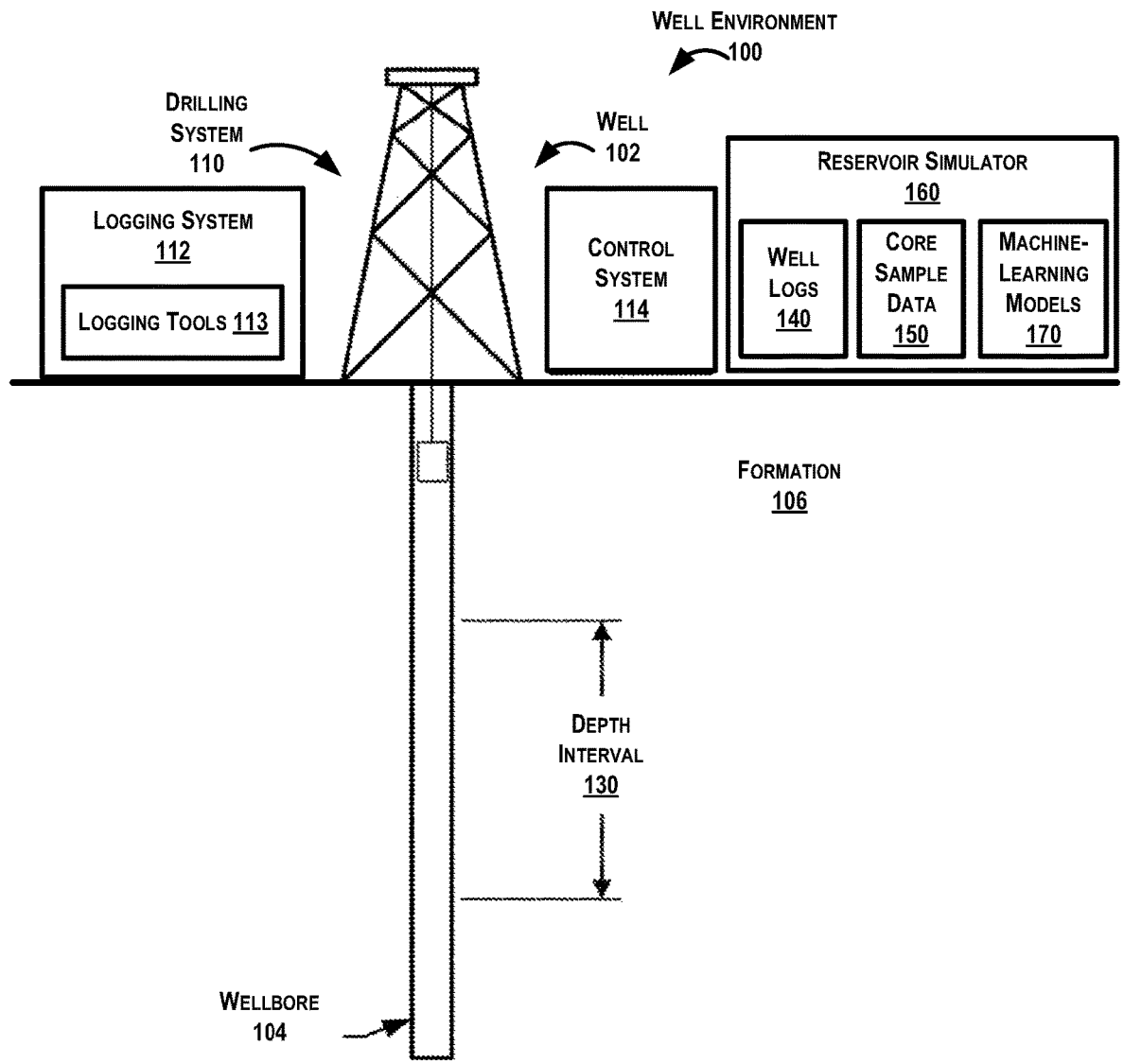
FIG. 1 shows a system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using dielectric log data to determine oil saturation values in a formation. In particular, some embodiments include using a neural network model to predict sponge core data from dielectric log data. Typically, core samples acquired using a sponge coring tool may be used to measure in-situ fluid saturation. In particular, sponge coring may provide an accurate estimate of oil saturation inside a formation compared to conventional coring techniques. For example, the sponge liner in a sponge coring tool may trap bleeding oil within a core sample, where normal coring techniques may lose this portion of oil during coring acquisition.

Furthermore, the relationship between oil saturation data derived from sponge core samples and dielectric log data may be approximated using an artificial intelligence workflow. More specifically, the artificial intelligence workflow may perform such an approximation for dielectric log data with the same rock type, reservoir zone, and/or porosity values as the training data. As such, a machine-learning model may be trained using an acquired sponge core dataset and a dielectric log dataset. After training, the model may use dielectric logs as an input to predict sponge core data and thus the oil saturation values within a formation. Using a neural network model, for example, the model may obtain sponge core oil saturation results without performing a costly and time-consuming operation of collecting and analyzing sponge core samples. Likewise, dielectric log data may be acquired in real-time at a well site using wireline operations, where sponge coring may require core samples be safely transported to a remote lab away from the well site for further analysis. Accordingly, to analyze a sponge core sample, the analysis process may require upwards of six months to complete following acquisition of the original sponge core sample.

Turning to FIG. 1, FIG. 1 shows a schematic diagram in accordance with one or more embodiments. As shown in FIG. 1, FIG. 1 illustrates a well environment (100) that may include a well (102) having a wellbore (104) extending into a formation (106). The wellbore (104) may include a bored hole that extends from the surface into a target zone of the formation (106), such as a reservoir. The formation (106) may include various formation characteristics of interest, such as formation porosity, formation permeability, resistivity, water saturation, free water level (FWL), and the like. Porosity may indicate how much space exists in a particular rock within an area of interest in the formation (106), where oil, gas, and/or water may be trapped. Permeability may indicate the ability of liquids and gases to flow through the rock within the area of interest. Resistivity may indicate how strongly rock and/or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (114), and a reservoir simulator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

Turning to the reservoir simulator (160), a reservoir simulator (160) may include hardware and/or software with functionality for generating one or more machine-learning models (170) regarding the formation (106). For example, the reservoir simulator (160) may store well logs (140) and core sample data (150), and further analyze the well log data, the core sample data, seismic data, and/or other types of data to generate and/or update the one or more machine-learning models (170). For example, different types of models may be trained, such as support vector machines, decision trees, inductive learning models, deductive learning models, supervised learning models, etc. While the reservoir simulator (160) is shown at a well site, in some embodiments, the reservoir simulator (160) may be remote from a well site.

In some embodiments, the machine-learning models (170) include one or more neural network models. For example, a neural network model may include one or more hidden layers, where a hidden layer includes one or more neurons. A neuron may be a modelling node that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining a specified output of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, a neural network model is a deep neural network. For example, a deep neural network may include three or more hidden layers, while a perceptron neural network may have only a single hidden layer. In deep neural networks, a layer of neurons may be trained on a predetermined list of features based on the previous network layer's output. Thus, as data progress through the neural network, more complex features may be identified within the data by neurons in later layers.

In some embodiments, the reservoir simulator (160) is implemented in a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir simulator (160) may include a computer system that is similar to the computer system (500) described below with regard to FIGS. 5A and 5B and the accompanying description.

The logging system (112) may include one or more logging tools (113), such as a nuclear magnetic resonance (NMR) logging tool and/or a resistivity logging tool, for use in generating well logs (140) of the formation (106). For example, a logging tool may be lowered into the wellbore (104) to acquire measurements as the tool traverses a depth interval (130) (e.g., targeted reservoir section) of the wellbore (104). The plot of the logging measurements versus depth may be referred to as a "log" or "well log". Well logs (104) may provide depth measurements of the well (102) that describe such reservoir characteristics as formation porosity, formation permeability, resistivity, water saturation, and the like. The resulting logging measurements may be stored and/or processed, for example, by the control system (114), to generate corresponding well logs (140) for the well (102). A well log may include, for example, a plot of a logging response time vs true vertical depth (TVD) across the depth interval (130) of the wellbore (104).

Reservoir characteristics may be determined using a variety of different techniques. For example, certain reservoir characteristics can be determined via coring (e.g., physical extraction of rock samples) to produce core samples and/or logging operations (e.g., wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores" or "core samples") from the formation (106) and bring the plugs to the surface, and these core samples may be analyzed at the surface (e.g., in a lab) to determine various characteristics of the formation (106) at the location where the sample was obtained.

Turning to various coring technique examples, conventional coring may include collecting a cylindrical sample of rock from the wellbore (104) using a core bit, a core barrel, and a core catcher. The core bit may have a hole in its center that allows the core bit to drill around a central cylinder of rock. Subsequently, the resulting core sample may be acquired by the core bit and disposed inside the core barrel. More specifically, the core barrel may include a special storage chamber within a coring tool for holding the core sample. Furthermore, the core catcher may provide a grip to the bottom of a core and, as tension is applied to the drill string, the rock under the core breaks away from the undrilled formation below coring tool. Thus, the core catcher may retain the core sample to avoid the core sample falling through the bottom of the drill string.

With respect to special coring techniques, coring may also be performed using a wireline-conveyed percussion sidewall coring or mechanically-drilled sidewall-coring techniques. For example, special coring techniques may be used where conventional coring techniques are unavailable or a special coring sample is required for a special analysis. In another example, a rotary-drilled sidewall coring technique may acquire undamaged core samples suitable for special core testing. Examples of special coring techniques may include using heavy duty conventional core barrels, disposable inner core barrels, core barrel lines, and/or a full-closure coring system. In particular, full-closure coring systems may be used for coring in an unconsolidated formation. More specifically, a full-closure coring system may use disposable inner barrels and/or inner barrel liners and a special core-catching system to retrieve soft cores during sample acquisition.

Another special coring technique includes sponge coring. For example, a sponge coring tool may include a sponge sleeve or liner modification to an inner core barrel that is used in conventional coring. This sponge sleeve may be made of a tough porous polyurethane sponge, such that the sponge absorbs oil that bleeds from the core sample. The oil-wet sponge may hold oil tightly, while allowing water and gas to move through the sponge and out vent holes drilled in the aluminum liner. As such, the sponge may be analyzed for oil that is reconstituted back into the core's porosity to adjust the oil saturation for bleeding. Likewise, a sponge coring tool may include a conventional core barrel fitted with a series of sponge-lined aluminum inserts, where the sponge coring tool cuts a relatively small core, e.g., 2.5 inches wide and 30 feet long.

Furthermore, the sponge core may be analyzed in a laboratory for an amount of hydrocarbons trapped in the polyurethane sponge. Reservoir fluids may be present inside the extracted sponge core, mainly oil and water. Thus, the amount of fluids saturating the core sample may be determined by conventional core analysis techniques. Once the core is transported in the lab, the sponge core sample may be processed for fluid extraction process, e.g., cleaned, cut, plugged, labeled and/or depth marked. The sponge may be separated from the core sample and analyzed using a spectrophotometric device after cleaning. For example, where the sponge is mixed with a solvent like toluene or iso-octane, the mixture of oil/solvent may have a different color spectrum based on the amount of oil dissolved and concentration inside the toluene.

Likewise, the sponge core may be analyzed using a distillation extraction process, e.g., a Dean-Stark process. In a Dean Stark process, core plugs undergo two cleaning cycles to completely dry the sample by extracting oil, distilled water and dissolved salt inside the water. The first cleaning cycle may include boiling the core sample under a solvent that does not absorb any water, such as toluene, that allows extraction of both the oil and distilled water from the core sample. The distilled water may be collected in a calibrated receiver and measured accordingly. The second cleaning cycle may include soaking the core sample under another solvent, such as methanol, which may remove salt from the core sample. Before and in-between both cleaning cycles, the core samples may be dried and weighed. The amount of oil inside the core sample may be calculated by gravimetric difference between the initial weight of the sample, final dry weight of the sample and weight of extracted water.

Turning to examples of logging techniques, multiple types of logging techniques are available for determining various reservoir characteristics. For example, NMR logging measures the induced magnetic moment of hydrogen nuclei (i.e., protons) contained within the fluid-filled pore space of porous media (e.g., reservoir rocks). Thus, NMR logs may measure the magnetic response of fluids present in the pore spaces of the reservoir rocks. In so doing, NMR logs may measure both porosity and permeability, as well as the types of fluids present in the pore spaces. For determining permeability, another type of logging may be used that is called spontaneous potential (SP) logging. SP logging may determine the permeabilities of rocks in the formation (106) by measuring the amount of electrical current generated between drilling fluid produced by the drilling system (110) and formation water that is held in pore spaces of the reservoir rock. Porous sandstones with high permeabilities may generate more electricity than impermeable shales. Thus, SP logs may be used to identify sandstones from shales.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs. In general, sound waves may travel faster through high-density shales than through lower-density sandstones. Likewise, density logging may also determine porosity measurements by directly measuring the density of the rocks in the formation (106). Furthermore, neutron logging may determine porosity measurements by assuming that the reservoir pore spaces within the formation (106) are filled with either water or oil and then measuring the amount of hydrogen atoms (i.e., neutrons) in the pores.

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high resistivities. As such, resistivity measurements obtained via such logging can be used to determine corresponding reservoir water saturation ($S_w$).

Another type of logging technique includes dielectric logging. For example, dielectric permittivity may be defined as a physical quantity that describes the propagation of an electromagnetic field through a dielectric medium. As such, dielectric permittivity may describe a physical medium's ability to polarize in response to an electromagnetic field, and thus reduce the total electric field inside the physical medium. In a portion of reservoir rock, water may have a large dielectric permittivity that is higher than any associated rock or hydrocarbon fluids within the portion. In particular, water permittivity may depend on a frequency of an electromagnetic wave, water pressure, water temperature, and salinity of the reservoir rock mixture. Table 1 below summarizes the dielectric permittivities of various example reservoir rocks and fluids:

TABLE 1

Material Permittivities

| Material Type | Dielectric Permittivity ($\varepsilon_r$) |
|---|---|
| Quartz | 4.4 |
| Sandstone | 4.65 |
| Limestone | 7.5 to 9.2 |
| Dolomite | 6.8 |
| Oil | 2.2 |
| Air, Gas | 1.0 |
| Water | 50 to 78 |

Furthermore, while electromagnetic waves propagate without losing energy in a vacuum, electromagnetic waves in porous reservoir rocks are attenuated and phase shifted during transmission through the rock medium. Porosity measurements from various logs (e.g., density log, neutron long, sonic long, or an NMR log) may estimate the total porosity in reservoir rocks. In contrast, a multi-frequency dielectric logging tool may determine a value of the water-filled porosity in the reservoir rock.

Complex permittivity may be calculated by applying different mathematical mixing laws. In the Complex Refractive Index Model (CRIM), for example, complex permittivity may correspond to a volume weighted average of permittivity for all materials in the reservoir rock. As such, the CRIM may determine the total permittivity at electromagnetic wave high frequencies, such as those in the GHz range. The total permittivity may be expressed by the following equation:

$$\sqrt{\varepsilon^*} = (1-\phi_t)\sqrt{\varepsilon_{mat}} + \phi_t S_{xo}\sqrt{\varepsilon_w^*} + \phi_t(1-S_{xo})\sqrt{\varepsilon_h} \quad \text{Equation 1}$$

where $\phi_t$ is total porosity of a sample, $S_{xo}$ is a flushed zone water saturation in the sample, $\varepsilon_w^*$ is a water or mud filtrate permittivity in the sample, $\varepsilon_{mat}$ is a matrix permittivity of the sample, $\varepsilon_h$ is a hydrocarbon permittivity of the sample, and $\varepsilon^*$ is the complex permittivity of the sample. By setting $S_{xo}$ to be a value of '1', equation 1 may rewritten using the following equation:

$$\phi_w^{(CRIM)} = (\sqrt{\varepsilon^*} - \sqrt{\varepsilon_{mat}})/(\sqrt{\varepsilon_w^*} - \sqrt{\varepsilon_{mat}}) \quad \text{Equation 2}$$

where $\phi_w^{(CRIM)}$ is total water-filled porosity of a rock sample.

Therefore, the remaining oil saturation (ROS) may be defined somewhere between a value of the irreducible water saturation (SWI) and Residual Oil Saturation (SOR). Accordingly, the remaining oil saturation may be estimated by subtracting the water filled porosity from the total porosity and dividing the results by total porosity.

Keeping with dielectric logging, a dielectric logging tool may determine a dielectric constant (i.e., relative-permittivity) measurement. For example, the dielectric logging tool may include an antenna that detects relative dielectric constants between different fluids at a fluid interface. As such, a dielectric logging tool may generate a dielectric log of the high-frequency dielectric properties of a formation. In particular, a dielectric log may includes two curves, where one curve may describe the relative dielectric permittivity of the analyzed rock and the other curve may describe the resistivity of the analyzed rock. Relative dielectric permittivity may be used to distinguish hydrocarbons from water of differing salinities. However, the effect of salinity may be more important than the salinity effect with a high-frequency dielectric log (also called an "electromagnetic propagation log").

Furthermore, dielectric logging tools may include low-frequency tools and high-frequency tools. A low-frequency dielectric logging tool may use coils on a mandrel and operate at tens of megahertz. For a high-frequency dielectric logging tool, also called an electromagnetic propagation tool (EPT), the dielectric logging tool may use a microwave antennae on a pad contact device. For example, the high-frequency dielectric logging tool may measure propagation time and attenuation of an electromagnetic wave as the electromagnetic wave passes through a specific interval of formation. As such, electromagnetic waves may be sent sequentially by two transmitters in the dielectric logging tool, where receivers may measure the amplitude and phase shift of the transmitted electromagnetic waves.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
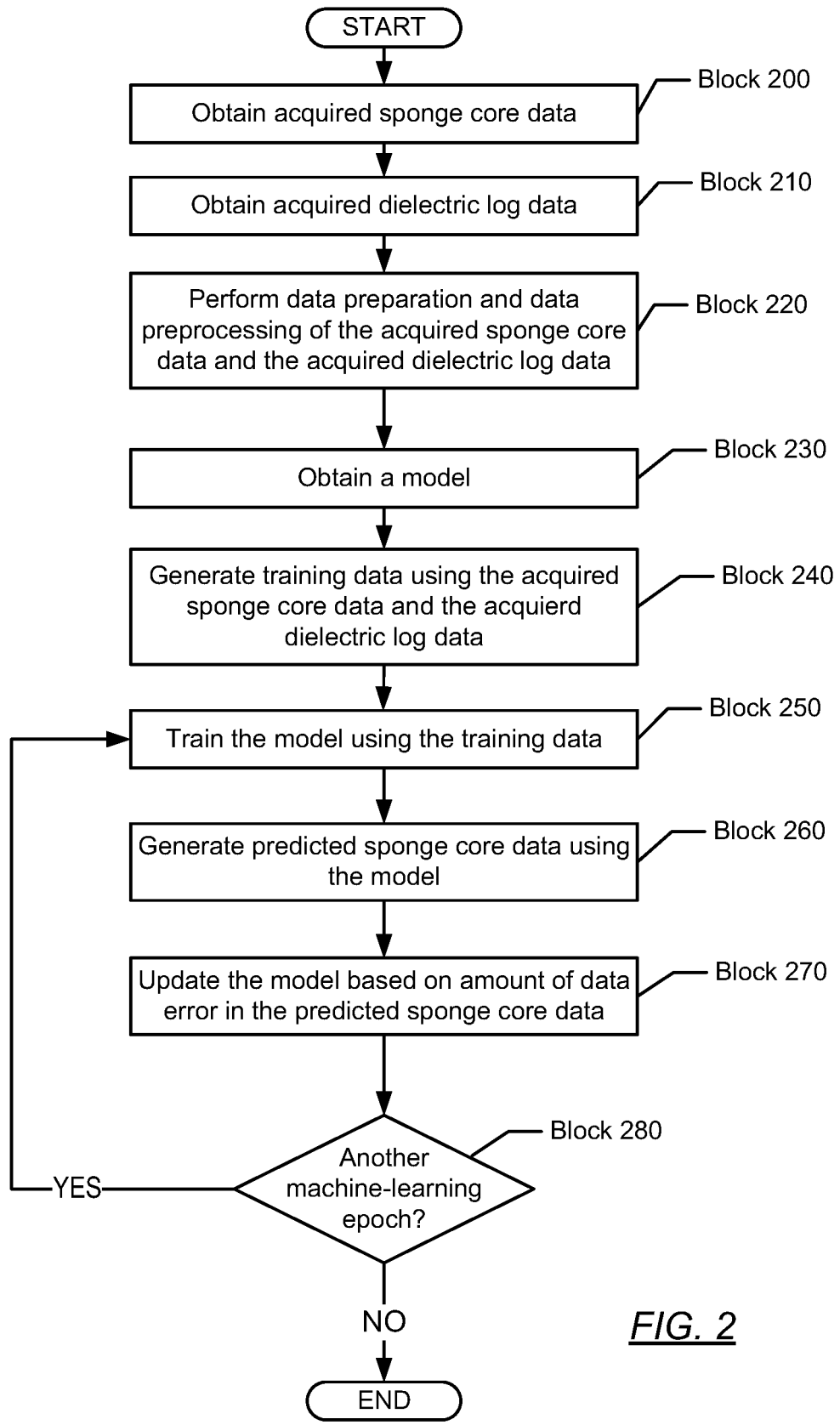
FIG. 2 shows a flowchart in accordance with one or more embodiments.

Turning to FIG. 2, FIG. 2 shows a flowchart in accordance with one or more embodiments. Specifically, FIG. 2 describes a method for generating a model. One or more blocks in FIG. 2 may be performed by one or more components (e.g., reservoir simulator (160)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, acquired sponge core data is obtained in accordance with one or more embodiments. For example, a sponge coring tool similar to the sponge coring tools described above in FIG. 1 and the accompanying description may acquire multiple sponge core sample from a wellbore. Accordingly, the sponge core samples may be further analyzed to determine sponge core data, e.g., remaining oil saturation within the sponge core sample. Likewise, the acquired sponge core data may be acquired from multiple well sources, e.g., different wells in different formations, in order to provide a sufficient training data set in Block 240 below.

In Block 210, acquired dielectric log data is obtained in accordance with one or more embodiments. For example, dielectric well logs may be acquired using a dielectric logging tool as described above in FIG. 1 and the accompanying description. Similar to the acquired sponge core data, the acquired dielectric log data may also be acquired from multiple well sources similar to the acquired sponge core data.

In Block 220, data preparation and/or data preprocessing are performed on acquired sponge core data and dielectric log data in accordance with one or more embodiments. In regard to data preparation, sponge core data and/or dielectric log data may be quality checked and filtered to remove any spurious data points from a dataset prior to model training. In particular, dielectric logs may have a shallow depth of investigation and thus wash-out intervals due to mud-invasion during drilling may be filter from the dielectric log data. Also, sensor saturation points may be removed from the data where high measurement uncertainty exists and/or acquisition tool limitations make the data unreliable. In some embodiments, a core-to-log depth shift may be applied to compare sponge core and dielectric logs.

In regard to data preprocessing, rock types and reservoir zones data may be determined from the sponge core data and/or dielectric log data. Likewise, sponge core data and dielectric log data may be scaled. e.g., to a range of [−1, 1], for input to training and/or verification of a machine-learning model. For example, a linear transformation may be applied to the data based on the maximum and minimum values of each data variable to scale the data.

In Block 230, a model is obtained in accordance with one or more embodiments. For example, the model may be may be a machine learning model that is capable of approximating solutions of complex non-linear problems, such as a machine-learning model similar to the machine-learning models (170) described above in FIG. 1 and the accompanying description. Likewise, the model may be obtained and initialized with weights and/or biases prior to training. In some embodiments, the model is a neural network model with a single hidden layer and three neurons.

In Block 240, training data is generated using acquired sponge core data and dielectric log data in accordance with one or more embodiments. In particular, the acquired sponge core data and/or the dielectric log data may be divided into various subsets for training, prediction, and testing. In some embodiments, synthetic sponge core data or synthetic dielectric log data may be used to supplement the training dataset. Likewise, the training data may be further divided among multiple machine-learning epochs.

In some embodiments, acquired sponge core data and dielectric log data are filtered according to different rock types and/or different reservoir zones for training a model for a particular type of reservoir. For example, in order to obtain a consistent comparison between sponge core data acquired by different sponge coring tools, oil saturations from different core samples may be compared using samples with similar rock types and/or reservoir zones. Thus, acquired data may be filtered according to such formation properties. In particular, rock types may correspond to different types of reservoir rock that are deposited under similar conditions with similar porosity-permeability relationships. In some embodiments, for example, a rock type is identified with a specific value based on the measured porosity value and the measure permeability value of the corresponding rock type. This specific value may be calculated using a Winland R35 equation or a ratio of air permeability to porosity.

A reservoir zone may correspond to a flow unit that separate subsurface layers with different production contributions within a reservoir. For example, different flow units may experience different rates of change in reservoir flow and storage capacity during production or stimulation. As such, a flow unit may be defined as a mappable portion of a total reservoir within which geological and petrophysical properties affecting the flow of fluids are substantially consistent. Thus, a reservoir zone may differs from a lithofacies zone in that a reservoir zone may be defined according to geological, petrophysical, and/or production data in order to describe fluid flow pathways with the reservoir. In contrast, a lithofacies zones may only describe a distribution of distinctive lithologies. Thus, a reservoir zone may include different rock types.

Furthermore, the training data may require a sufficient amount of data for training and/or validating the model across various reservoirs. Thus, the training data may be organized where an oil saturation frequency distribution falls into a normal distribution for a particular rock type and/or a particular reservoir zone.

In Block 250, a model is trained using training data in accordance with one or more embodiments. For example, various machine-learning algorithms may be use to train the model, such as a supervised learning algorithm. Supervised learning algorithms may include linear regression algorithms, nearest neighbor algorithms, decision trees, etc. In some embodiments, for example, the model is trained using a neural network.

In some embodiments, the model is trained with input parameters that include a remaining oil saturation value based on a dielectric log for a geological region of interest, a rock type for the geological region of interest, a reservoir zone type for the geological region of interest, and a porosity value for the geological region of interest. For example, a geological region of interest may be a portion of a wellbore at a particular depth interval. Likewise, the output parameter during the model training may include an oil saturation value from a sponge core sample, i.e., as a training target for the model.

In some embodiments, a model is trained using multiple machine-learning epochs. For example, a machine-learning epoch may be an iteration of a model through a portion or all of the training data. For example, a single machine-learning epoch may correspond to a specific batch of dielectric log data and acquired sponge core data, where the training data is divided into multiple batches for multiple epochs. Thus, a model may be trained iteratively using epochs until the model achieves a predetermined level of accuracy in predicting sponge core data from dielectric log data. Better training of the model which in turn may lead to better predictions for updating the model. Once the training data is passed through all of the epochs and the model is further updated based on the model's predictions of sponge core data in each epoch, a trained model may be the final result of the machine-learning algorithm. In some embodiments, multiple trained models are compared and the best trained model is selected accordingly.

In Block 260, predicted sponge core data is generated using a model in accordance with one or more embodiments. After training, the model may be used to predict oil saturation or sponge core data of a geological region of interest using dielectric log data. This dielectric log data is different from the data using during the training period. Thus, the model may predict sponge core data in order to measure the model's current degree of machine learning.

In Block 270, a neural network model is updated based on an amount of data error in predicted sponge core data in accordance with one or more embodiments. Based on the difference between predicted sponge core data and actual sponge core data, weights and biases within the model may be updated accordingly. In some embodiments, the neural network update is performed using a backpropagation algorithm, such as a Levenberg-Marquardt algorithm. In particular, a backpropagation algorithm may be a supervised learning algorithm that uses various methods, such as gradient descent, the Newton method, etc., to update the neural network model. For example, Block 270 may calculate a gradient using an error function with respect to the model's weights to perform an update on the weights. Likewise, in a backpropagation algorithm, calculation of the gradient may proceeds backwards through the neural network model, with the gradient of the final layer of weights being determined first and the gradient of the initial layer of weights being determined last.

When using a Levenberg-Marquardt algorithm, for example, the backpropagation algorithm may use a sum of squared errors as the error function, e.g., in a Jacobian matrix. More specifically, a gradient vector and a damping factor may be determined with respect to the Levenberg-Marquardt algorithm's error function in order to generate a particular update for the neural network model. For different calculated damping factors, for example, the Levenberg-Marquardt algorithm may update in a similar manner as the gradient descent algorithm or Newton's method.

In Block 280, a determination is made whether to continue training a neural network model using another machine-learning epoch to achieve a better prediction of various targets in accordance with one or more embodiments. When a determination is made that no further machine-learning epochs are required for training the model, the process may end. When a determination is made that one or more machine-learning epochs remain to be performed, the process may return to Block 250.

In some embodiments, the model generated in the process described above in FIG. 2 may be used with the same rock types and reservoir zones pertaining to a trained subsurface formation. Likewise, this process may also be used to include other types of formations that have different rock type/reservoir zone classifications. Accordingly, the trained data in Block 240 may be augmented with acquired data for subsurface formations for other rock types and/or reservoir zones. Thus, a trained model may be further enhanced, trained, and validated to cover wider ranges of reservoirs, rock types and reservoir zones.

Figure 3:
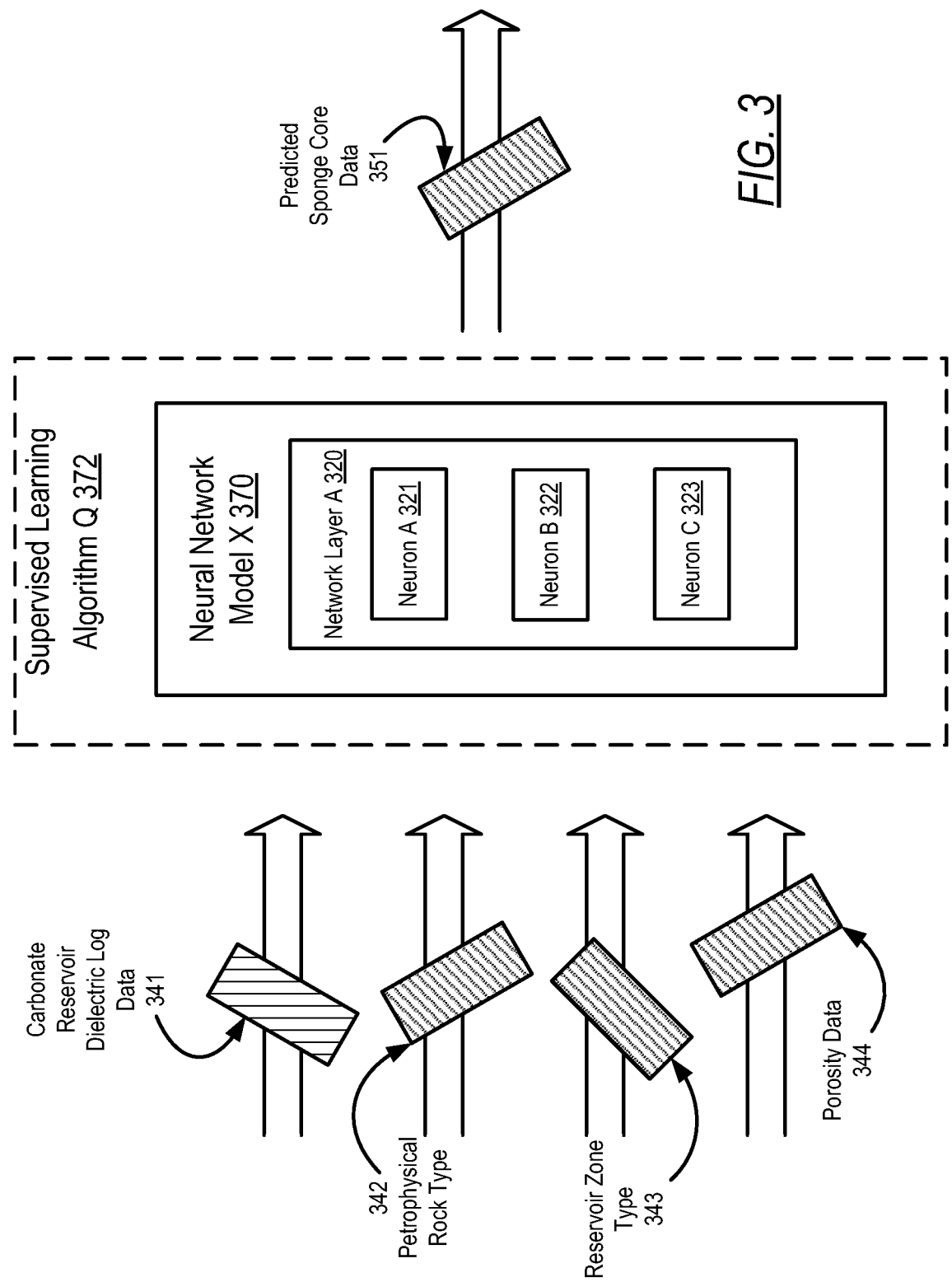
FIG. 3 shows an example in accordance with one or more embodiments.

Turning to FIG. 3, FIG. 3 provides an example of generating a neural network model to predict sponge core data. The following example is for explanatory purposes only and not intended to limit the scope of the disclosed technology.

In FIG. 3, a neural network model X (370) is trained using a supervised learning algorithm Q (372) for predicting sponge core data for a carbonate reservoir Y. In particular, the neural network model X (370) includes a single network layer A (320) that includes three neurons, i.e., neuron A (321), neuron B (322), neuron C (323). Moreover, the neural network X (370) obtains four inputs for training, i.e., carbonate reservoir dielectric log data (341) for a geological region of interest, a petrophysical rock type (342) associated with the geological region of interest, a reservoir zone type (343) associated with the geological region of interest, and porosity data (344) associated with the geological region of interest. The petrophysical rock type (342) and the porosity data (344) may be obtained from other well log data besides dielectric log data.

As shown in FIG. 3, the output of the neural network model X (370) is carbonate reservoir sponge core data (351). As such, the neural network model X (370) may follow a similar generation process as Blocks 240-280 as shown above in FIG. 2. Thus, the neural network model X (370) is trained using acquired data and then updated in response to analyzing predicted sponge core data (351) for the carbonate reservoir Y with acquired sponge core data from the carbonate reservoir Y.

Figure 4:
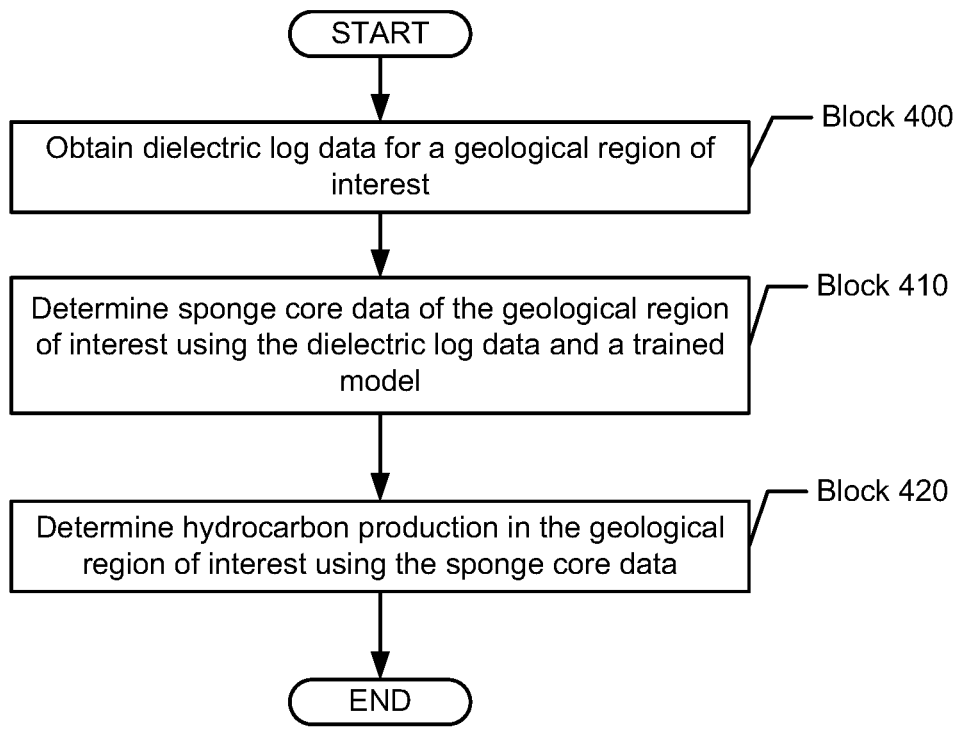
FIG. 4 shows a flowchart in accordance with one or more embodiments.

Turning to FIG. 4, FIG. 4 shows a flowchart in accordance with one or more embodiments. Specifically, FIG. 4 describes a method for using a neural network model to determine sponge core data. One or more blocks in FIG. 4 may be performed by one or more components (e.g., reservoir simulator (160)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, dielectric log data is obtained for a geological region of interest in accordance with one or more embodiments. For example, dielectric log data may be similar to the dielectric log data described above in FIG. 1 and the accompanying description. Likewise, the geological region of interest may be a portion a depth interval within a wellbore. Thus, the geological region of interest may be some portion of a reservoir that is desired for modelling.

In Block 410, sponge core data of a geological region of interest is determined using dielectric log data and a model in accordance with one or more embodiments. The model may be a model similar to the model trained above in FIG. 2 and the accompanying description. In some embodiments, for example, the model may be a neural network model with one hidden layer and three neurons.

In Block 420, hydrocarbon production is determined in a geological region of interest using sponge core data in accordance with one or more embodiments. For example, the sponge core data may include oil saturation data that is used to model the geological region of interest.

In some embodiments, oil saturation data obtained from the generated sponge core data may be used to determine an oil saturation profile and/or a reservoir sweep evaluation and displacement efficiency analysis. An oil saturation profile may describes vertical and areal extent of oil within the geological region of interest. Thus, the oil saturation profile may be used for stimulation plans for enhancing well production or simply modeling future reservoir production.

With regard to a reservoir sweep efficiency, a reservoir sweep efficiency may correspond to a measured degree of effectiveness of an enhanced oil recovery process with respect to a reservoir. For example, a degree of stimulation by an injection well may depend on the volume of the reservoir contacted by the injected fluid as well as the degree of oil saturation in various regions of the reservoir. Thus, volumetric sweep efficiency of a reservoir may be based on a selected injection pattern, off-pattern wells, fractures in the reservoir, position of gas-oil and oil/water contact interfaces, reservoir thickness, permeability and areal and vertical heterogeneity, and other parameters. For example, sponge core data may be used in connection with other types of core sample data and well log data. Thus, multiple sources of reservoir data may be obtained using different coring and logging methods to determine the remaining oil saturation profile across the vertical and areal extent of a particular formation. Reservoir sweep efficiency may be used to define the recovery potential of a reservoir region of interest.

Figure 5A:
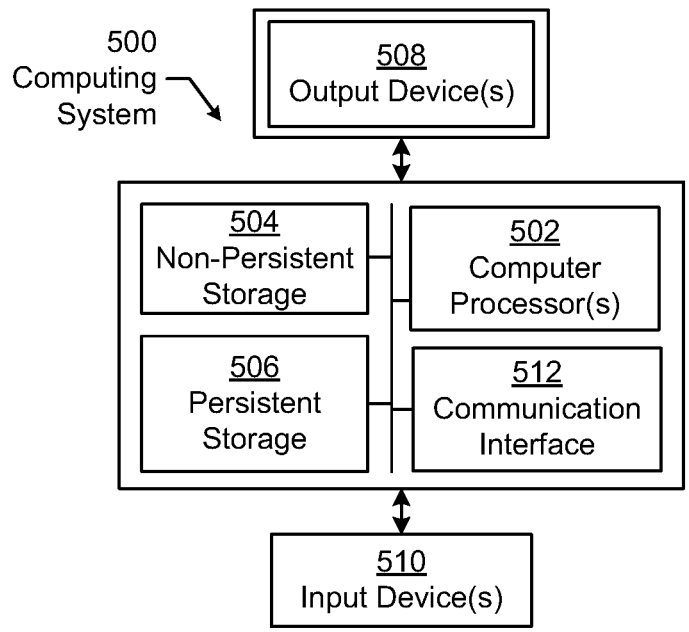
FIGS. 5A and 5B show a computing system in accordance with one or more embodiments.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
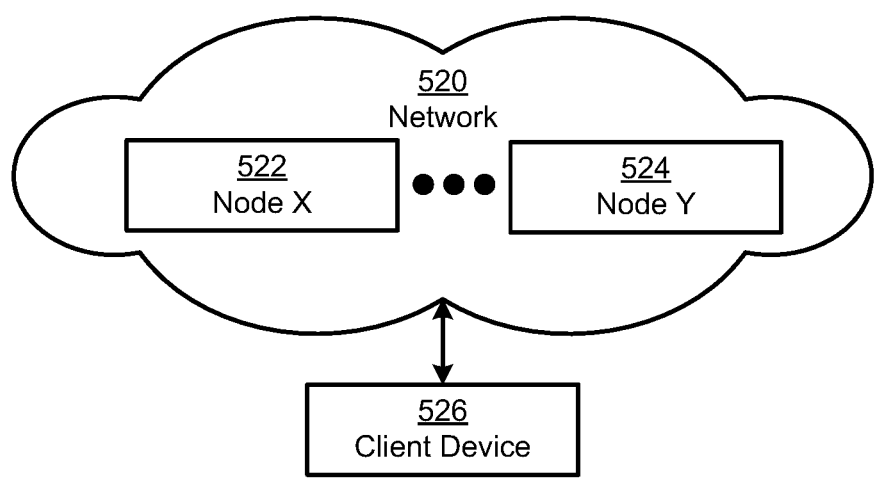

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the disclosure, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method, comprising:
obtaining, using a plurality of sponge coring tools, acquired sponge core data from a plurality of wells in a plurality of formations, wherein at least one sponge coring tool among the plurality of sponge coring tools comprises a core barrel and a sponge sleeve that is made of a polyurethane sponge;
obtaining, using a dielectric logging tool, dielectric log data regarding a geological region of interest wherein the dielectric logging tool comprises an antenna, at least one transmitter configured to transmit an electromagnetic field, and at least one receiver configured to measure a phase and an amplitude of the electromagnetic field;
obtaining, by a computer processor, a rock type for the geological region of interest, a reservoir zone type for the geological region of interest, and a porosity value for the geological region of interest using one or more well logs;
generating, by the computer processor, predicted sponge core data of the geological region of interest using a neural network model, the rock type, the reservoir zone type, the porosity value, and the dielectric log data,
wherein the rock type, the reservoir zone type, the porosity value, and the dielectric log data are data inputs to the neural network model,
wherein the predicted sponge core data comprises an oil saturation value that describes an amount of oil found in a core sample acquired during a coring operation in the geological region of interest, and
wherein the neural network model is trained using a plurality of dielectric logs the acquired sponge core data, and a backpropagation algorithm; and
determining, by the computer processor and using the predicted sponge core data, an amount of hydrocarbons in the geological region of interest.

2. The method of claim 1,
wherein the neural network model comprises at least one hidden layer, and
wherein the neural network model comprises a plurality of neurons.

3. The method of claim 1, further comprising:
obtaining a plurality of well logs regarding the geological region of interest; and
determining, based on the predicted sponge core data from the neural network model and the plurality of well logs, a reservoir sweep efficiency for the geological region of interest,
wherein the reservoir sweep efficiency describes an amount of injection fluid within an enhanced oil recovery process that affects a reservoir comprising the geological region of interest.

4. The method of claim 1, further comprising:
determining, using the predicted sponge core data, an oil saturation profile of the geological region of interest,
wherein the oil saturation profile describes vertical and areal extent of oil within the geological region of interest.

5. The method of claim 1,
wherein the computer processor is disposed in a reservoir simulator coupled to a control system and a drilling system in a well environment.

6. A system, comprising:
a plurality of sponge coring tools, wherein at least one sponge coring tool among the plurality of sponge coring tools comprises a core barrel and a sponge sleeve that is made of a polyurethane sponge;

a logging system coupled to a plurality of logging tools, wherein the plurality of logging tools comprises a dielectric logging tool, and wherein the dielectric logging tool comprises an antenna, at least one transmitter configured to transmit an electromagnetic field, and at least one receiver configured to measure a phase and an amplitude of the electromagnetic field; and a reservoir simulator comprising a computer processor, wherein the reservoir simulator is coupled to the logging system and comprises functionality for:

obtaining acquired sponge core data from a plurality of wells in a plurality of formations, wherein the acquired sponge core data is generated using the plurality of sponge coring tools;

obtaining, using the dielectric logging tool, dielectric log data regarding a geological region of interest using the logging system;

obtaining a rock type for the geological region of interest, a reservoir zone type for the geological region of interest, and a porosity value for the geological region of interest using one or more well logs;

generating predicted sponge core data of the geological region of interest using a neural network model, the rock type, the reservoir zone type, the porosity value, and the dielectric log data, wherein the rock type, the reservoir zone type, the porosity value, and the dielectric log data are data inputs to the neural network model, wherein the predicted sponge core data comprises an oil saturation value that describes an amount of oil found in a core sample acquired during a coring operation in the geological region of interest, and wherein the neural network model is trained using a plurality of dielectric logs the acquired sponge core data, and a backpropagation algorithm; and determining, using the predicted sponge core data, an amount of hydrocarbons in the geological region of interest.

7. The system of claim 6, wherein the neural network model comprises at least one hidden layer, and wherein the neural network model comprises a plurality of neurons.

8. The system of claim 6, wherein the reservoir simulator further comprises functionality for:

obtaining a plurality of well logs regarding the geological region of interest; and determining, based on the predicted sponge core data from the neural network model and the plurality of well logs, a reservoir sweep efficiency for the geological region of interest, wherein the reservoir sweep efficiency describes an amount of injection fluid within an enhanced oil recovery process that affects a reservoir comprising the geological region of interest.

* * * * *